(12) United States Patent
Meyer et al.

(10) Patent No.: US 10,350,951 B2
(45) Date of Patent: Jul. 16, 2019

(54) CONTROL ARM AND METHOD FOR PRODUCING SAME

(71) Applicant: ZF Friedrichshafen AG, Friedrichshafen (DE)

(72) Inventors: Wolfgang Meyer, Goldenstedt (DE); Ignacio Lobo Casanova, Friedrichshafen (DE); Martin Wachtel, Köln (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 106 days.

(21) Appl. No.: 15/329,265

(22) PCT Filed: Jun. 29, 2015

(86) PCT No.: PCT/EP2015/064629
§ 371 (c)(1),
(2) Date: Jan. 26, 2017

(87) PCT Pub. No.: WO2016/015933
PCT Pub. Date: Feb. 4, 2016

(65) Prior Publication Data
US 2017/0210187 A1 Jul. 27, 2017

(30) Foreign Application Priority Data

Jul. 29, 2014 (DE) .......... 10 2014 214 827

(51) Int. Cl.
*B60G 7/00* (2006.01)
*B29C 45/14* (2006.01)
(Continued)

(52) U.S. Cl.
CPC .......... *B60G 7/001* (2013.01); *B29C 37/0085* (2013.01); *B29C 45/14467* (2013.01);
(Continued)

(58) Field of Classification Search
CPC ..................................................... B60G 7/005
See application file for complete search history.

(56) References Cited

U.S. PATENT DOCUMENTS 2,976,068 A * 3/1961 Jordan .................. B60G 7/005
403/51
3,843,272 A * 10/1974 Jorn ....................... B60G 7/005
403/132
(Continued)

FOREIGN PATENT DOCUMENTS

DE       102 11 582 A1    9/2002
DE       102004048753 A1 *  4/2006 ............. B60G 7/005
(Continued)

OTHER PUBLICATIONS

German Search Report Corresponding to 10 2014 214 827.8 dated Mar. 11, 2015.
(Continued)

*Primary Examiner* — Nicole T Verley
(74) *Attorney, Agent, or Firm* — Davis & Bujold PLLC; Michael J. Bujold

(57) ABSTRACT

A method of producing a control arm for a motor vehicle, in particular a multi-point control arm, preferably a transverse control arm, which is substantially formed by a fiber-plastic composite structure. The method includes the steps: creating of a preform structure with load-adapted fiber orientation, introducing the preform structure into a forming tool, consolidating the preform structure in the tool by application of pressure and/or temperature, and removing and further processing of the control arm.

11 Claims, 7 Drawing Sheets

(51) Int. Cl.
   *B29C 70/44*   (2006.01)
   *B60G 17/019*   (2006.01)
   *B29C 37/00*   (2006.01)
   *B29C 70/48*   (2006.01)
   *B29L 31/30*   (2006.01)
   *B29L 31/06*   (2006.01)
   *B29K 705/02*   (2006.01)

(52) U.S. Cl.
   CPC ............ *B29C 70/443* (2013.01); *B29C 70/48* (2013.01); *B60G 7/005* (2013.01); *B60G 17/019* (2013.01); *B29K 2705/02* (2013.01); *B29L 2031/06* (2013.01); *B29L 2031/30* (2013.01); *B29L 2031/3055* (2013.01); *B60G 2204/416* (2013.01); *B60G 2206/124* (2013.01); *B60G 2206/7101* (2013.01); *B60G 2206/80* (2013.01); *B60G 2400/60* (2013.01); *B60G 2400/94* (2013.01)

(56) References Cited

U.S. PATENT DOCUMENTS

| | | | | |
|---|---|---|---|---|
| 5,163,769 | A * | 11/1992 | Dresselhouse | B60G 7/005 403/133 |
| 6,879,240 | B2 * | 4/2005 | Kruse | B60G 7/005 338/12 |
| 7,938,417 | B2 * | 5/2011 | Ersoy | B60G 7/001 280/124.134 |
| 8,685,868 | B2 | 4/2014 | Bouillon et al. | |
| 8,870,202 | B2 * | 10/2014 | Teijeiro Castro | B60G 21/005 280/124.106 |
| 9,011,748 | B2 | 4/2015 | Eifflaender et al. | |
| 9,168,801 | B2 * | 10/2015 | Dicke | B60G 7/001 |
| 9,227,480 | B2 * | 1/2016 | Jekel | B60G 7/005 |
| 2002/0153648 | A1 | 10/2002 | Lawson | |
| 2010/0237580 | A1 * | 9/2010 | Vortmeyer | B60G 7/005 280/124.134 |
| 2015/0217614 | A1 * | 8/2015 | Aoki | F16C 11/083 403/133 |
| 2018/0154719 | A1 * | 6/2018 | Kwon | B29C 45/14 |

FOREIGN PATENT DOCUMENTS

| | | | |
|---|---|---|---|
| DE | 60 2006 000 582 T2 | 2/2009 | |
| DE | 10 2008 011 658 A1 | 9/2009 | |
| DE | 10 2008 046 991 A1 | 3/2010 | |
| DE | 10 2011 010 367 A1 | 8/2012 | |
| DE | 10 2011 077 337 A1 | 12/2012 | |
| DE | 10 2011 053 222 A1 | 3/2013 | |
| DE | 10 2012 017 944 A1 | 3/2014 | |
| EP | 2 759 423 A1 | 7/2014 | |
| WO | WO-2005021296 A1 * | 3/2005 | ............ B60G 7/005 |
| WO | WO-2017138573 A1 * | 8/2017 | ............ B60G 7/005 |

OTHER PUBLICATIONS

International Search Report Corresponding to PCT/EP2015/064629 dated Sep. 24, 2015.
Written Opinion Corresponding to PCT/EP2015/064629 dated Sep. 24, 2015.

* cited by examiner

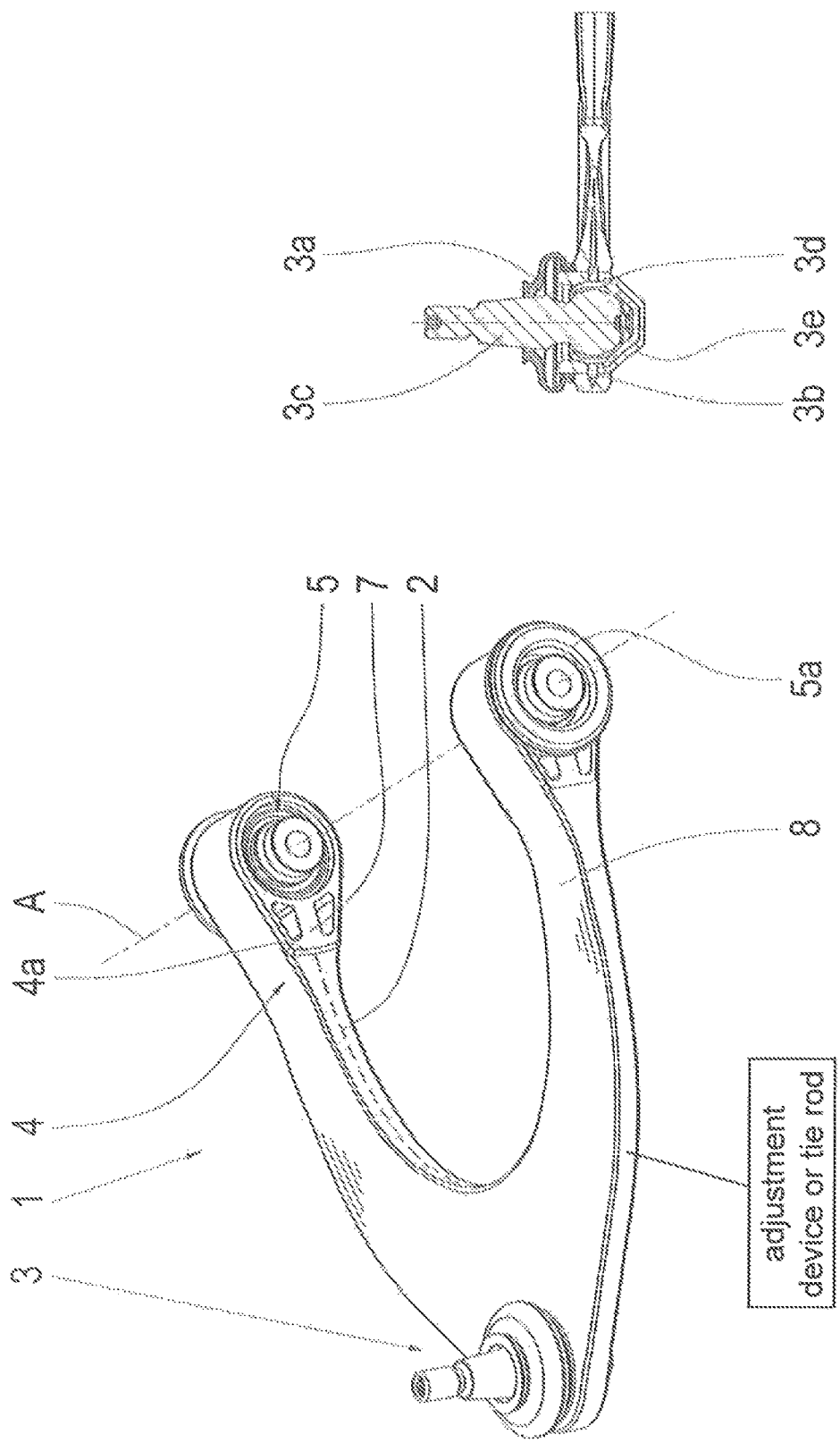

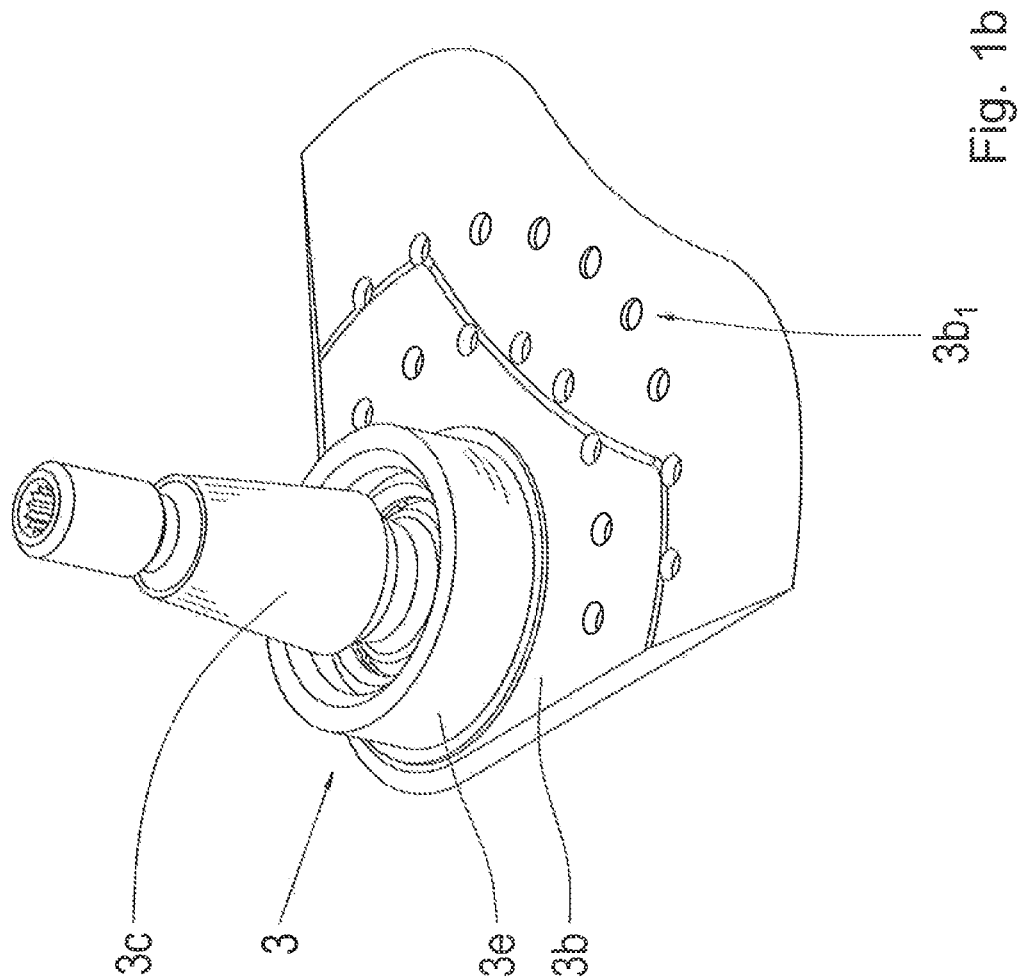

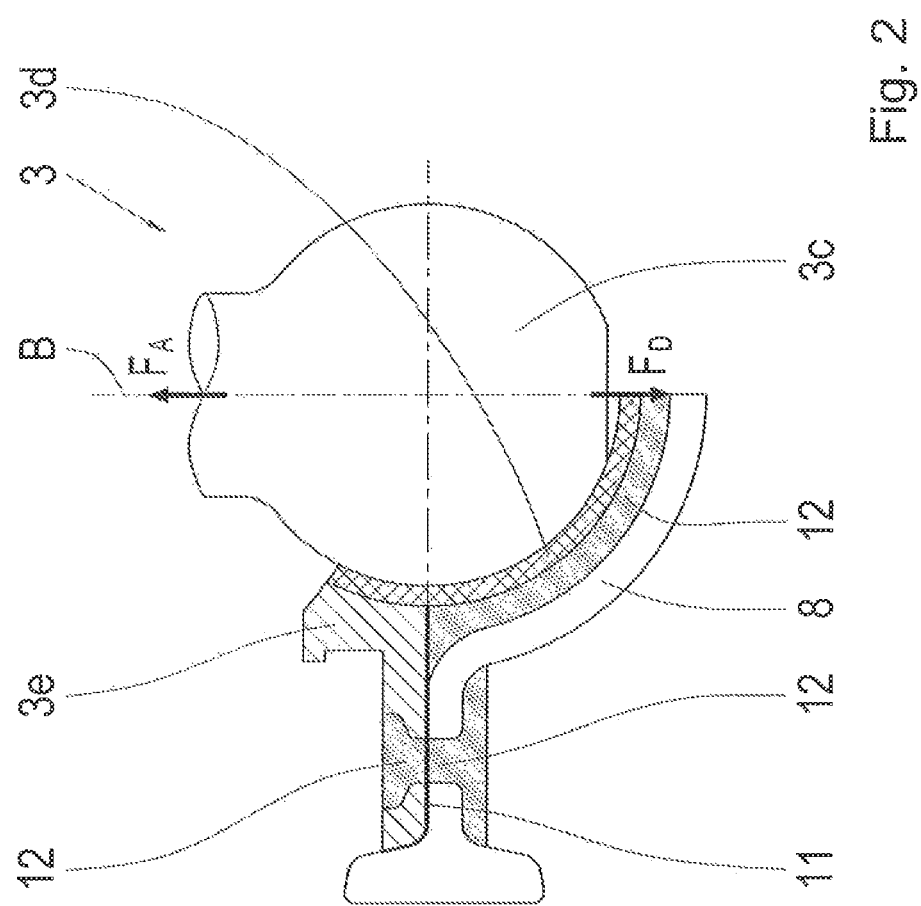

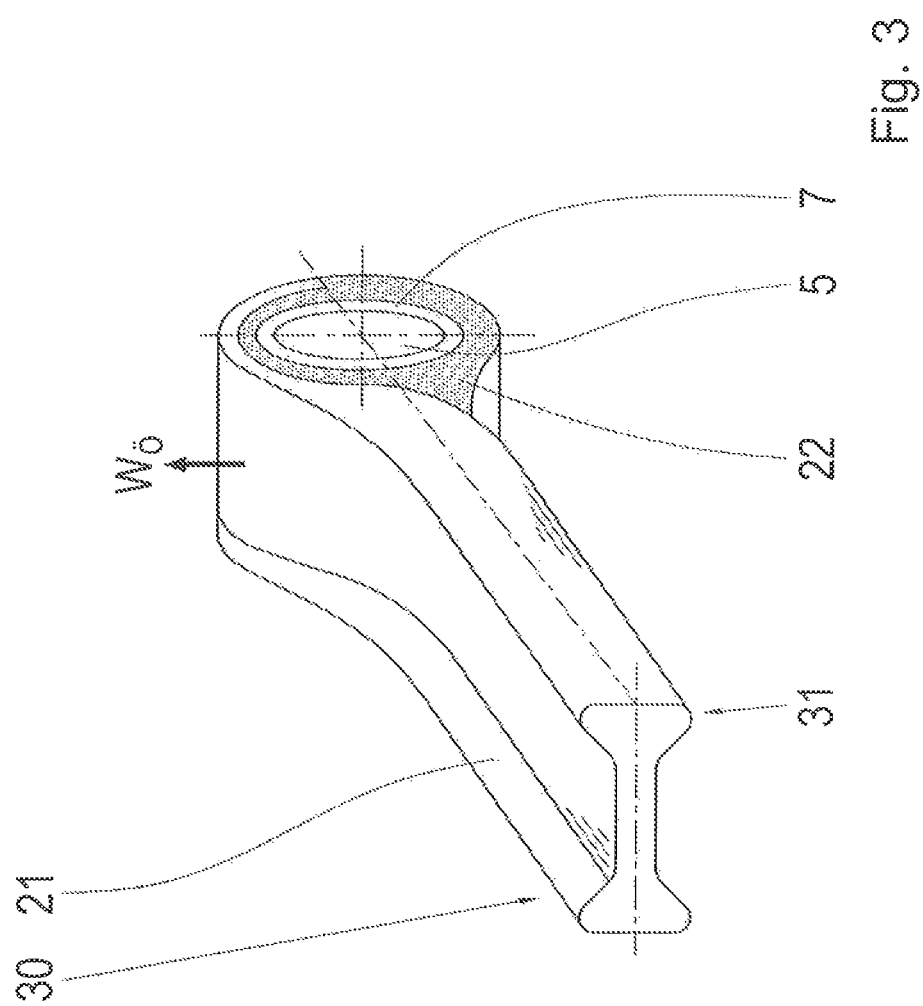

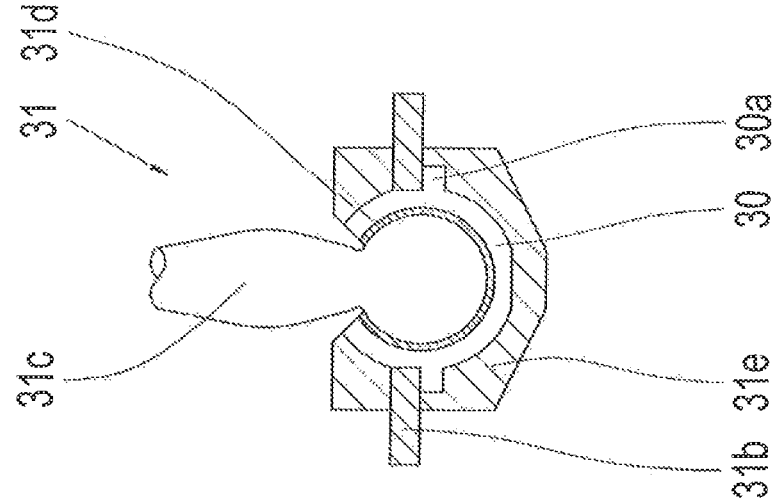
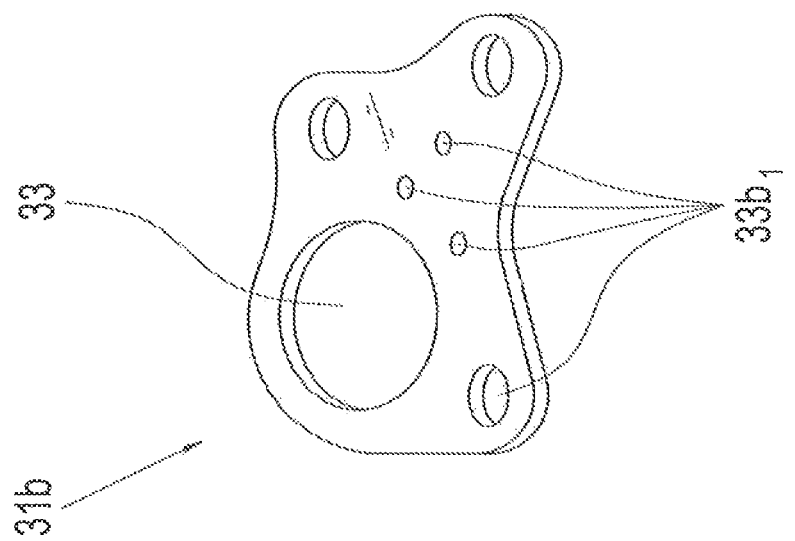

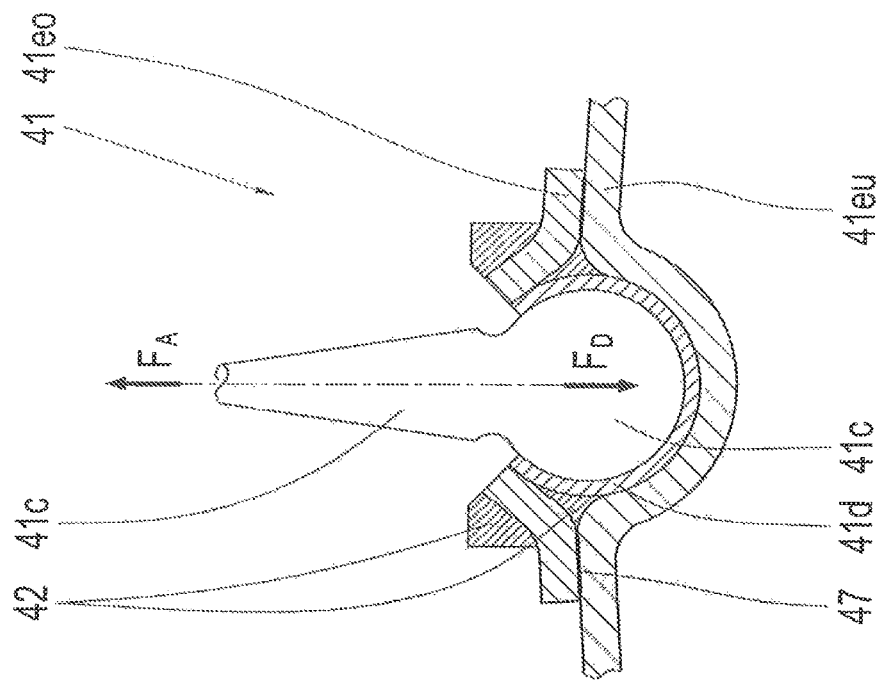
Fig. 4b
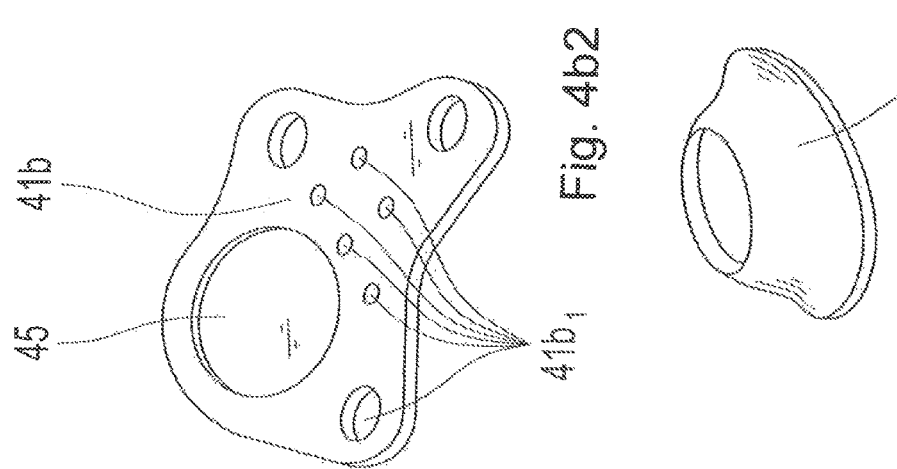
Fig. 4b2
Fig. 4b1

CONTROL ARM AND METHOD FOR PRODUCING SAME

This application is a National Stage completion of PCT/EP2015/064629 filed Jun. 29, 2015, which claims priority from German patent application serial no. 10 2014 214 827.8 filed Jul. 29, 2014.

FIELD OF THE INVENTION

The invention relates to a method for producing a control arm for a motor vehicle, in particular a multi-point control arm, preferably a transverse control arm, which is substantially formed by a fiber-plastic composite structure. The invention additionally relates to a control arm for a motor vehicle, in particular a multi-point control arm, preferably a transverse control arm, which is substantially formed by a fiber-plastic composite structure, wherein the fiber-plastic composite structure has at least one means for receiving at least one additional chassis part, in particular a ball joint and/or elastomer bearing.

BACKGROUND OF THE INVENTION

A chassis part for an automobile is known from DE 10 2011 010 367 A1, which chassis part has a base body and a reinforcement structure made of plastic, by means of which the base body is reinforced, wherein the base body is formed from fiber-reinforced plastic with at least one fiber inlay. The chassis part disclosed in this publication has a low weight compared with steel, due to the fiber-reinforced plastic used for the base body. In order to nevertheless meet the strength and stiffness value requirements for a motor vehicle chassis with low deformation and expansion behavior, the base body is provided with a reinforcement structure made of plastic, which is molded onto the base body with a suitable injection molding material. This injection-molded reinforcement structure represents additional weight and it makes an additional operation to produce the chassis part necessary.

With chassis components according to the above-mentioned published patent application, an additional challenge is to integrate additional chassis components in the form of bearings, such as rubber bearings or ball joints, for example, without damaging or weakening the fiber composite plastic structure.

SUMMARY OF THE INVENTION

By means of a method for producing a control arm from a fiber-plastic composite structure or a control arm produced according to such a method, it is possible to solve the conflicting objectives of providing a chassis component which is both economical and more light-weight and which satisfies the high standards required of chassis. Against this background, the present invention provides a method for the production of a control arm for a motor vehicle and a control arm for a motor vehicle made from a fiber-plastic composite structure according to the main claims. Advantageous embodiments emerge from the following description.

One object of the invention is a method for the production of a control arm for a motor vehicle, in particular a multi-point control arm, preferably a transverse control arm, which is substantially formed by a fiber-plastic composite structure, comprising the steps:

creation of a preform structure with load-adapted fiber orientation, introduction of the preform structure into a forming tool, consolidation of the preform structure in the tool by means of application of pressure and/or temperature, removal and further processing of the control arm.

A preform structure is understood to mean a blank which consists of at least one flat textile material and is brought into its final form in the production method by means of a forming tool under the effect of pressure and temperature. Due to the component requirements, there is determination, for example by means of finite element methods (FEM), of the stresses or loads which the control arm component to be produced is subjected to, for example in a passenger car, and of which principal stress directions result therefrom. On the basis of the then known loads (in terms of intensity and direction) which subsequently act on the finished component, a flat textile is mechanically produced, so that a preform structure with load-adapted fiber orientation is provided. In simple terms, a fiber compaction is provided at positions in the component where greater stresses can be expected. At less stressed locations, the fibers lie less tightly packed. Because it is disadvantageous to interrupt fiber-plastic composite structures or their fibers, the fibers of the textile are laid such that they are for example conducted around subsequently envisaged cavities or holes for receiving additional chassis components. The flat textiles can be produced in a single layer or multiple layers, in particular starting from a single layer, with methods such as tailored fiber placement (TFP), the Jacquard method, fiber-matrix combined method, commingling method and/or the film stacking method being used. By means of these known methods, almost any conceivable structure, and thus also any required load-adapted fiber orientation, can be produced. The preform structure produced by means of this method step already suggests the form of the subsequent component. In particular however, the load-adapted fiber orientation makes it possible to identify at which location a greater stress will be applied to the component during subsequent usage. In a next step, the preform structure is inserted into a forming tool. This can occur manually or mechanically by means of suitable handling machines. The forming tool determines the final form of the subsequent control arm. The previously rather flat and thus rather planar textile structure can assume a variety of different forms in the forming tool. It is thus possible to envisage a variety of different geometries, which are known from the field of conventional control arms made from metal (flat, planar, with corrugations and/or bars, I- and/or U- and/or V-shaped).

The control arm is preferably designed as a planar component, because control arms depicted here need not have reinforcing corrugations or bars for strength purposes. After closure of the forming tool, the preform structure is consolidated in the tool by means of application of pressure and/or temperature. In the consolidation or consolidation process, a hardening of the starting material or of the fiber-plastic composite structure is obtained by means of an increase of pressure and temperature and maintenance of these parameters for a predetermined time period, which is dependent on the base material of the preform structure. The consolidation or the consolidation process is also known as "hot pressing" or "pressing and curing". This involves the starting material of the preform structure combining with a matrix material (e.g. in the form of so-called hybrid yarns) which is already provided in or on the preform structure before the introduction into the tool. Alternatively, the matrix material is introduced into the tool at high pressure, in particular in the form of a resin, and the consolidation process then takes place in the tool. A homogeneous fiber-plastic composite is thus produced in the consolidation. The application of matrix materials in the form of resin, which is also referred to as "infiltration", or in the form of hybrid yarns, is discussed below.

Subsequent to the consolidation, a cooling can occur in the tool, which can take place in a closed or opened tool within a determined time period which is dependent on the material. Alternatively, a controlled active cooling inside the tool can also occur, in that an active cooling takes place in the tool by means of a fluid, in particular a gas or a liquid. After this, the finished component can be removed from the forming tool and conveyed onwards for further processing. This does not mean that the control arm has not already been or cannot be produced to the finished level by means of the method steps described above. What is important in the presented method is that no separate reinforcement structure known from the prior art, e.g. in the form of back injection molding or molding on, is attached to the control arm inside the tool. The additional step for the introduction of a reinforcement means is dispensed with entirely. It is evident that an end product is thus obtained which is more advantageous with regards to cycle time and thus also with regards to costs. The absence of a reinforcement structure thus also makes it possible to anticipate a lower weight than a component with reinforcement means.

In one preferred embodiment, at least one chassis part and/or a means for providing a bearing surface or for receiving a bearing on the control arm or for receiving at least one additional chassis part is introduced into the preform structure before and/or during and/or after the introduction of the preform structure into the forming tool. Such a chassis part can consist for example of a ball joint or an elastomer bearing, in particular a rubber bearing, preferably a bush bearing, and most preferably a hydraulic bearing. By means of these bearings, a connection to other components such as control arms, wheel carriers or bodywork components is possible in the chassis. For this purpose, the tool has suitable seats, which correspond to the subsequent position of the chassis parts or bearing seats on the finished control arm. This method step is particularly advantageous because the at least one chassis part and/or means for receiving bearings is either connectable to the control arm only with great difficulty subsequently or with a correspondingly high level of effort after the control arm is finished. This possible integration also provides improved strength of the integrated components or of the entire control arm. This thus advantageously results in a reduction of the time required to produce the finished control arm.

During the consolidation, the preform structure is preferably infiltrated with a matrix material which, introduced into the tool, is in particular injected in the form of a resin. The introduced matrix material is preferably a resin which cures during the consolidation process by means of the application of pressure and temperature. It is thus possible to influence the component properties in a targeted manner by means of the matrix material.

The infiltration with matrix material during the consolidation is preferably undertaken according to the RTM method, in particular according to T-RTM or HP-RTM methods. The T-RTM method is thermoplastic resin transfer molding, also referred to as in-situ methods or reactive injection molding, in which the chemical starting materials required for a polymerization are applied to the preform structure situated in the tool. These chemical starting materials form a so-called thermoplastic matrix material by means of a chemical reaction. The HP-RTM method is the high pressure resin transfer molding method, in which a thermosetting matrix material is applied. This is particularly advantageous when a folded preform structure is inserted into the tool. This is the case when, in the case of creation of the preform structure with load-adapted fiber orientation, it has a form which is mirror-symmetrical and which is folded approximately, and preferably exactly, on its mirror axis, before it is inserted into the forming tool. A component with a homogeneous cross section is thus produced, which has no connection surface between the parts which are folded onto one another. This connection surface is usually present when the control arm consists, as is known from the prior art, of a fiber composite base body with a subsequently molded-on reinforcement structure made of plastic. Even when using so-called thermoplastic hybrid yarns, which do not require an application of matrix material in the consolidation process, a homogeneous cross section is obtained with the invention thanks to the consolidation process. When using thermoplastic hybrid yarns, these are applied onto the preform structure as early as the creation of the preform structure with load-adapted fiber orientation, preferably by means of mechanical stitching. During the creation of the preform structure it is thus already possible to introduce into the fiber-plastic composite structure a sensor which is provided to subsequently determine the stress and/or a sensor cable of a damage detection system. The hybrid yarns consist of a textile carrier thread with a thermoplastic matrix, such as e.g. polyimide (PA), polyetheretherketone (PEEK), polypropylene (PP) or the like. The textile carrier thread can be twisted with the matrix material. Alternatively, the matrix material can surround the carrier thread, e.g. by surrounding the carrier thread when said carrier thread in particular extends inside the matrix material. The thermoplastic matrix is formed similar to a woolen thread with regards to its form and the consistency.

In another embodiment, after the consolidation inside the tool it is possible to introduce onto the control arm, in particular by means of assembly injection molding, at least one additional chassis part and/or a means for receiving at least one additional chassis part. A bonding agent may need to be provided before the assembly injection molding, which bonding agent is applied onto the consolidated/cured preform structure or onto the chassis part or means.

If envisaging producing the control arm from a material combination, in other words, for example from a fiber-plastic composite structure and additionally a light metal, preferably an aluminum or magnesium housing for a ball joint, this can occur inside the tool by means of inexpensive assembly injection molding which is suitable for large production runs. If a ball joint is to be integrated into the control arm, a bottom part of the ball socket for example can be formed from a fiber-plastic composite structure, whereas the upper part of the housing, which secures the ball of a joint pivot in the housing against pullout, is held by means of thermoplastic or thermosetting overmolding, by means of injection, bonding or also by means of a rivet joint produced in particular by means of overmolding. The potential design thereof is referred to in the description below.

In a preferred manner, the introduction of a chassis part or the means for receiving a bearing is realized chronologically after the HP-RTM method by means of the BMC method and/or SMC method, in particular the DSMC method, in a supplementary or combined manner.

SMC (Sheet Molding Compounds) and BMC (Bulk Molding Compounds) involves a type of fiber-reinforced plastic, which is produced in a prefabrication of resins, hardeners, fillers, additives, etc. and glass fiber pieces, e.g. up to 50 mm in length, and which is produced specifically in the case of SMC in a so-called prepreg. After a maturation period (storage period), e.g. several days at ca. 30-40° C., there is an increase in the viscosity of the resin material (BMC) or of the prepreg (SMC). At this specifically determined viscosity, the prepreg or the resin material can, depending on the composition, be further processed. The further processing then takes place in heated tools using the compression molding method. The fiber-reinforced plastic (e.g., prepreg) is brought into precisely defined dimensions, depending on the component dimensions and geometry, and placed in the tool according to a defined insertion plan. When the press is closed, the prepreg or the material is distributed throughout the tool. The viscosity increase achieved previously during the maturation period drops back to almost the level of the semi-finished production. The advantage of this material class lies in the simple constitution of three-dimensional geometries and wall thickness differences in just one work step. The final component form is provided by the cavity of an at least two-part tool and usually presents smooth, optically attractive surfaces on both sides, BMC/SMC components are highly durable due to their large fiber length. With DSMC, a special form of SMC, the storage period is advantageously effectively reduced, which has a positive effect on series production and cost reduction.

Using the presented method, it is thus possible to produce in a rapid and cost-effective manner a control arm for a motor vehicle, in particular a multi-point control arm, preferably a transverse control arm, which is substantially formed by a fiber-plastic composite structure, wherein the fiber-plastic composite structure has at least one means for receiving at least one additional chassis part, in particular a ball joint and/or elastomer bearing, so that the fiber-plastic composite structure is integrally formed in a materially-locking manner and without a reinforcement structure.

As already stated in relation to the fundamental method steps, the control arm has no separate reinforcement structure. The control arm can thus be simply realized because additional weight resulting from an injection-molded reinforcement structure is dispensed with. The fiber-plastic composite structure is preferably produced from a load-adapted preform structure, wherein the preform structure is produced in particular as a flat, textile TFP and/or using the Jacquard method and/or from fiber-matrix combined material and/or commingling material and/or film stacking material, in particular in a multilayer form. The afore-mentioned method makes it possible to produce a control arm of almost any type with regards to form and properties of the kind also known from previous forms made from metal or formed from fiber-plastic composite with a reinforcement structure.

The load adaption is preferably formed by means of fiber orientation on the preform structure in the form of hybrid yarns which are introduced singly and/or plurally on top of one another and/or next to one another, in particular stitched in or stitched on. When hybrid yarns are used, these are yarns into which a thermoplastic matrix is integrated. The flat textile preform structure can consist entirely or partially of these hybrid yarns and can be provided with a reinforcing fiber made of glass fiber or carbon fiber or similar known materials. As matrix materials for the fiber-matrix system to be used, it is possible to envisage either thermoplastic TFP constructions on the basis of polypropylene (PP), polyimide (PA), semi-aromatic PA (PPA) or other thermoplastic hybrid yarns or else dry textile semi-finished products or constructions produced using the TFP method, which are then saturated or infiltrated with resin using the thermoplastic RIM or T-RTM method or thermosetting HP-RTM method. When "dry" or a dry structure or a dry textile or textile semi-finished product or a textile construction is mentioned in connection with the preform structure, this means that (as yet) no matrix material has been introduced into the material (either in the form of hybrid yarn or in the form of resin or the like).

A bearing or a joint, in particular an elastomer bearing, preferably in the form of a sleeve bearing or bush bearing or a ball joint is preferably integrated into the control arm in a form-locking and/or materially-locking manner at at least one bearing location. The form-locking and/or materially-locking integration of said components ensures a reliable connection with the control arm, so that the requirements of the entire chassis component are met, in particular with regards to the chassis safety with respect to pullout forces.

In one particular embodiment, the means for receiving the bearing and/or joint is formed by a bush integrated into the control arm, which in particular consists of plastic, light metal or a fiber composite material, preferably of an aluminum or magnesium alloy and/or of a glass fiber plastic (GFRP) or carbon fiber plastic (CFRP). The bush is particularly preferably molded onto the fiber-plastic composite structure or adhered to same. This thus produces a durable and stress-resistant materially-locking connection of the bush to the control arm.

In another preferred embodiment, the bearing or joint is integrated into the control arm by means of a partially interrupted, in particular perforated, support structure of the bearing or joint, wherein the support structure is formed from metal or plastic, in particular from light metal or a fiber composite material. The interruption or holes in the support structure of the bearing or joint allow it to be advantageously connected to the control arm by means of overmolding. The material for connecting the bearing or joint to the control arm which is for example introduced in the assembly injection molding not only entirely surrounds the support structure, but also flows into the recesses or holes during the assembly injection molding process and thus produces a highly stressable type of materially-locking and form-locking connection.

In a particularly preferred manner, the means for receiving the bearing or the joint formed by the fiber-plastic composite structure forms a first part of a bearing bush or a joint housing, to which at least one additional housing part attaches, in particular in a form-locking manner, for receiving the bearing or a ball pivot of a ball joint, wherein the housing parts are connected to one another in a materially-locking and/or form-locking and/or force-locking manner.

In another embodiment, the connection of the housing parts is formed by means of bonding and/or riveting and/or by means of injection and/or by means of thermoplastic and/or thermosetting overmolding.

In a preferred manner, the housing part is formed from a metal material, in particular a light metal, preferably an aluminum alloy or magnesium alloy, wherein at least one additional material is inserted between the first and second housing parts, in particular by means of thermoplastic and/or thermosetting overmolding.

At least one sensor is preferably integrated into the fiber composite structure, which sensor detects a change in the fiber composite structure so as to inform of stress or over-stressing and/or overloading. The sensor is preferably connected to a detection device and/or an evaluation device. The driver in the vehicle cabin is preferably informed of the stress information, in particular optically and/or acoustically. Alternatively, the evaluation device is connected, in particular via a vehicle bus system (e.g., CAN bus), to a control device in the vehicle, so that stress values can be retrievably kept in a memory. In the event of a stress value being exceeded, the control device can influence the continuation of the journey or prevent a restart, so that a journey with a faulty control arm or chassis can be effectively avoided.

It is also preferred that an adjustment device is integrated into the control arm, so that the control arm is length adjustable or the control arm has a displaceable tie rod, which can be adjusted by means of the adjustment device, in particular linearly, in relation to the control arm.

The above-mentioned control arm is preferably used in a steering mechanism for an axle system, preferably for an axle system with rear-wheel steering.

BRIEF DESCRIPTION OF THE DRAWINGS

The invention is described below on the basis of preferred embodiments with reference to the drawings, in which:

FIG. 1 shows a perspective view of a multi-point control arm

FIG. 1a shows a partially cut away view of an end region of a control arm according to FIG. 1

FIG. 1b shows a detailed view of another end region of a control arm with a ball joint FIG. 2 shows a cross-sectional view through a control arm end with a ball joint FIG. 3 shows a perspective view of a control arm with a sleeve bearing or bush bearing FIGS. 4a, 4a1 show views of an embodiment of the ball joint for a control arm FIGS. 4b, 4b1, 4b2 show views of an alternative embodiment of the ball joint for a control arm

DETAILED DESCRIPTION OF THE PREFERRED EMBODIMENTS

Figure 5:
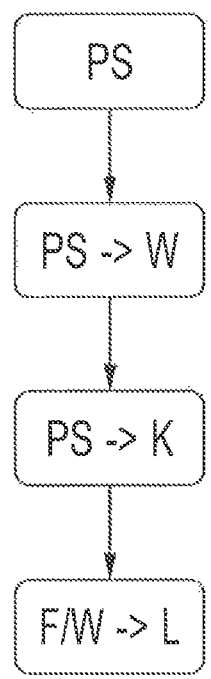
FIG. 5 shows a schematic view of the method for the production of a control arm

FIG. 1 shows a transverse control arm of a motor vehicle in the form of a three-point control arm, which is produced from a fiber-plastic composite structure. The transverse control arm 1 is constructed from a multilayer flat preform structure, which was brought into its presented form by means of folding approximately about the axis A depicted in FIG. 1. For receiving the rubber bearing 5, a bush 7 has been introduced into the region of the loop 4, which bush is formed approximately elliptical, so that a gusset piece in the loop region 4 which would otherwise be required can be dispensed with. The rubber bearing 5 has a collar 5a at one end which abuts the control arm 1 at the outside. A ball joint 3 is introduced on the end of the control arm 1 facing away from the rubber bearings 5. As depicted for the purpose of clarification in FIG. 1a or 1b in a cross-sectional view, the ball joint has a structural part 3b, which surrounds the ball pivot 3c and the bearing shell 3d. The structural part 3b and the bearing shell 3d are surrounded by a housing 3e. The ball joint 3, consisting of the above-mentioned components, is introduced here as a preassembled ball joint cartridge 3, wherein the housing 3e can consist of plastic, with which the ball pivot 3c with the bearing shell 3d surrounding the ball and the structural part 3b are overmolded. Alternatively, the structural part can however also be formed by the preform structure or a part thereof. This is discussed further below with regards to FIGS. 4a, 4a1 and 4b, 4b1 and 4b2.

For protection against external influences and corrosion, the ball joint 3 is protected on the pivot side by means of a sealing bellows 3a, which surrounds both the ball pivot 3c and the housing 3e in a form-locking manner. For the connection between the ball joint 3 and control arm 1, the structural part 3b is provided, which is entirely surrounded by the fiber-plastic composite structure. As can be seen from FIG. 1b, the structural part 3b has an approximately flat formation, which can flatten out to the side facing away from the ball joint 3 towards the end of the structural component. The structural component 3b is additionally perforated with holes $3b_1$, which are arranged spaced apart from one another, e.g. concentrically, at different radii about the longitudinal axis of the ball joint 3. The structural part 3b itself can be produced from a metal material or also from a fiber-plastic composite material. Because the structural part 3b is entirely surrounded by the fiber-plastic composite structure, a homogeneous connection between the ball joint 3 and the control arm 1 itself is obtained. Thanks to the holes $3b_1$, a particularly strong connection is achieved in the consolidation and infiltration process, because the control arm material and the matrix material penetrates the holes $3b_1$ during consolidation and the structural part 3b is thus also held in a form-locking manner, During production, a primer or the like is to be provided depending on the material of the structural part or of the housing 3e so that, depending on the material provided for the structural part, a materially-locking connection between the preform structure or the fiber-plastic composite structure and the structural part can also be provided in addition to the form locking.

When producing a ball joint 3, consisting of at least one ball pivot 3c and a housing 3e or a bearing shell 3d surrounding the ball of the ball pivot 3c, in principle a tempering process is required during the production of the ball joint or downstream of the production process. During the tempering, the ball joint is heated over a certain period of time, so that the bearing shell material or the joint between ball pivot and housing can settle. This is necessary in order to regulate the breakaway torque of the ball pivot inside the housing. This can be dispensed with because, during production of the control arm in the tool, temperatures which are sufficient for the tempering of the ball joint occur. This provides further potential for savings, since producing the ball joint or the cartridge does not require tempering thereof, but rather the tempering can be realized in the forming tool during the production of the control arm.

FIG. 1 presents a dashed line A, which indicates that the control arm is, with regards to the preform structure, a folded component. After the consolidation or production of the control arm, the upper and lower positions in the finished component are however designed integral and materially locking and they can no longer be distinguished from one another. The control arm 1 is designed as a flat component and no bars are provided in this embodiment. The production of a flat component requires a simplified tool if no bars are provided, which saves additional costs in production of the tool. This does not however rule out the potential provision of L- or U- or T-shaped bars due to exceptional stresses. The form of the bars depends on the mechanical demands of the control arm and can be locally adapted in all three spatial directions. The control arm 1 depicted here also has no corrugation-like elevations or depressions since these are not required due to the high level of strength and stiffness of the component. However, the potential provision, dependent on requirements, of elevations or depressions in the form of corrugations is not ruled out.

The bushes 7 already mentioned above can be designed as metal or polymer (plastic) bushes. During the production of the control arm 1 using the RTM method for example, whether realized in a thermosetting or thermoplastic manner, the bushes are inserted into the tool, with the rubber bearings having been pressed into the bushes in advance. In one variant, the bushes can however also be dispensed with and the rubber bearings can be inserted directly into the tool and overmolded with plastic. The gussets required in the control arms known from the prior art are also dispensed with here since they take on the gusset form and function.

Another variant for avoiding the gusset pieces is possible by means of stitching of the dry or pre-impregnated preform structure in the region of the joining of the top and bottom positions, in other words, in the depicted loop region 4 by means of intermediate stitching in the intermediate region 4a. After the folding of the preform structure, this intermediate stitching would be provided in the region 4a, before the bush 7 is introduced into the preform structure and thus before the preform structure is inserted into the tool;

FIG. 2 shows the integration of a ball joint 3 into a preformed fiber-plastic composite structure 8. This occurs in such a way that a housing made of metal, preferably a housing made of aluminum 3e, a ball pivot 3c with preassembled bearing shell 3d and the preformed fiber-plastic composite structure 8 (e.g., a preform structure created using TFP) are inserted into an injection molding tool, and overmolded in a thermoplastic (RTM) or thermosetting (HP-RTM) manner. The connection of the housing 3e can take place in a materially locking manner by means of a bond 11 or in a materially-locking or form-locking manner by means of overmoldings 12, which form a rivet, or by means of a combination of both options. The integration of the aluminum partial housing in the fiber-plastic composite structure to form a multi-material design ensures that high forces acting on the ball pivot, like the forces $F_A$ or $F_D$ depicted in FIG. 2, can be realized with a transverse control arm with a fiber-plastic structure, which would otherwise be achievable by means of potentially expensive fiber orientation which is difficult to produce.

For the integration of rubber bearings, it is not only control arms made of a fiber-plastic composite structure which are suitable, which control arms are based on a preform structure, which are folded before insertion into the tool or introduction of bearing bushes and/or rubber bearings.

The fiber-plastic composite structure or preform structure 21 depicted in FIG. 3, which is shown here with bars 30 and 31 which serve to reinforce the stiffness, is also designed without a reinforcement structure introduced or molded on during or after the consolidation process. For the purpose of integration of the rubber bearings 5 in the direction of the tool opening movement $W_O$, the fiber-plastic composite structure is designed without undercuts in such a way that it runs only halfway around the rubber bearings 5 or bush 7. A folding of the preform-fiber structure is thus not required, so that a further simplified production process for the integration of bushes or bearings is provided. The bush 7 is secured to the control arm 21 by means of an overmolding 22.

This principle is thus also suitable for preform structures, which are produced by means of the TFP method. These can consist of hybrid yarn with an integrated thermoplastic matrix. Alternatively, the preform structures can also consist of glass fiber or carbon fiber, which is then infiltrated with plastic or a plastic matrix using the thermoplastic (T-RTM) or thermosetting (HP-RTM) methods. The integration of the rubber bearing can be realized by means of injection using the plastic matrix in a similar way to the integration of a ball joint in one work step, in other words, during the infiltration of the preform structure with the plastic matrix. A cost-efficient single-stage process is thus obtained.

FIGS. 4a, 4a1 and 4b, 4b1 and 4b2 show additional variants of ball joints, which are also suitable for the integration into a fiber-plastic composite control arm.

FIGS. 4a and 4a1 show a ball joint 31 with a ball pivot 31c and a bearing shell 31d, wherein the ball pivot with the surrounding bearing shell is embedded in a metal housing or metal cage 30. It is also possible to see a structural component 31b, which surrounds the metal housing or the metal cage 30. In other words, the metal housing or the metal cage is inserted into the structural component 31b, so that the circumferential edge 30a abuts the hole in the structural component 31b. The housing 31e surrounds the aforementioned components in such a way that the ball pivot 31c has the swinging and pivoting ability of standard ball joints. The housing 31e is introduced by means of overmolding or surrounds the structural component 31b and the metal cage 30 to form a strong connection. The structural part can be designed from metal, from organic sheeting or also from a preform structure, which is produced for example using the TFP method. Organic sheeting is understood to mean a semi-finished product made of thermoplastic plastic reinforced with continuous fibers, which is usually produced in panel form. Organic sheeting can be plastically deformed under the effect of temperature (e.g. by means of the forming process deep drawing).

FIGS. 4b, 4b1 and 4b2 show an alternative which is changed slightly compared with FIGS. 4a and 4a1. The housing is designed in two parts here. The bottom part 41eu of the housing is designed like the structural part according to FIGS. 4a and 4a1, wherein no hole is provided, but instead a spherical recess or corrugation 45 is provided, which receives the bearing shell 41d or the ball of the ball pivot 41c at least partially, and preferably receives half thereof. The top part $41_{eo}$ or pivot-side part of the housing is formed by a conical ring $41_{eo}$, which is connected in a form-locking or materially-locking manner to the housing bottom part $41_{eo}$. In this way, the ball pivot 41c is held with the bearing shell 41d in the ball joint 41. The connection between the housing top part $41_{eo}$ and the housing bottom part $41_{eo}$ can, as already described with regards to FIG. 2, be provided by means of a bond 47 or, as also shown here, by means of an overmolding 42. The thus preassembled component is inserted into the forming tool to produce the control arm, so that the housing top and bottom parts are then surrounded in the consolidation process by means of the fiber composite material or the structure and the injected plastic matrix. This thus provides the ball joint 41 with sufficient strength with respect to the compressive forces $F_D$ or tractive forces $F_A$ applied through the ball pivot 41c, so that the pullout of the ball pivot as a result of these forces does not occur.

Alternatively, the structural part 31b, 41b is not a separate component, as described in the statements above, but is instead formed by the preform structure itself or an outer portion thereof, as already stated with regards to FIG. 1.

In a similar way to FIG. 4a1, the preform structure 31b has a hole 33 where subsequently the ball pivot 31c, optionally together with the bearing shell 31d and/or bearing cage 30, is overmolded with plastic in order to form the housing after the consolidation.

Alternatively to the afore-mentioned variant and in a similar way to FIG. 4b2, the portion of the preform structure is provided with a recess or corrugation or depression 45, which can be provided as early as during the production of the preform structure. The depression 45 can however also be introduced in that it is provided in the forming tool and is introduced after the insertion into the tool or is attached to the subsequent consolidation process. The portion of the preform structure thus forms the housing bottom part $41_{eu}$. The joint between housing top part $41_{eo}$ and housing bottom part $41_{eu}$ can, as described previously, be provided by means of a bond 47 or, as also depicted in FIG. 4b, by means of an overmolding 42.

FIG. 5 shows a sequence of the method steps according to the invention. In a first step PS, a preform structure is created, e.g., a flat textile construction (lattice, weave or knitted fabric, or the like), which is produced by means of the TFP method using hybrid yarns, e.g. by means of stitching on. In another step PS→W, the workpiece is introduced into a forming tool by means of a handling robot. Additional chassis components such as a bush bearing and/or ball joints are also introduced into the tool in this step. The tool is closed. In a subsequent step, the component is consolidated. A temperature adapted to the materials used and a predetermined pressure are generated in or with the tool and maintained for a determined period of time. The control arm is then finished and can be removed from the tool by means of a handling robot.

It shall be understood that the above-mentioned features of the invention can be used not only in the stated combination, but also in other combinations or in isolation, without exceeding the scope of the invention. It is also within the scope of the invention to realize a mechanical reversal of the functions of the individual mechanical elements of the invention.

REFERENCE CHARACTERS

1 Control arm
2 Theoretical connecting line
3, 31, 41 Ball joint, ball joint cartridge
3a, 31a Sealing bellows
3b, 31b, 41b Structural part
$3b_1$, $33b_1$, $41b_1$ Holes
3c, 31c, 41c Ball pivot, ball
3d, 31d, 41d Bearing shell
3e, 31e Housing
4 Loop region
4a Intermediate region
5 Rubber bearing
5a Collar
7 Bush
8 Preform structure, FPC structure
11 Bond
12, 22, 42 Injection, overmolding
21 Control arm
30 Metal housing, metal cage
30a Circumferential edge
41eu Housing bottom part
41eo Housing top part, conical ring
45 Corrugation, recess
47 Bond
$F_A$ Pullout force
$F_D$ Compressive force
$W_O$ Direction of tool opening

The invention claimed is:

1. A control arm for a motor vehicle which is substantially formed by a fiber-plastic composite structure,
the fiber-plastic composite structure having at least one of a ball joint and elastomer bearing,
the fiber-plastic composite structure being formed integrally and in a materially-locking manner without any reinforcement structure,
either the elastomer bearing or the ball joint is integrated into the control arm in at least one of a form-locking manner and a materially-locking manner at at least one bearing location, and
the elastomer bearing or the ball joint is integrated into the control arm by a perforated support structure, and the support structure is formed from either light metal or a fiber composite material.

2. The control arm according to claim 1, wherein the fiber-plastic composite structure is produced from a load-adapted preform structure, and the preform structure is at least one of:
produced as a flat, at least one-layer textile by using at least one of a tailored fiber placement method and a Jacquard method, and
formed from at least one of a fiber-matrix combined material, a commingling material and a film stacking material having multiple layers.

3. The control arm according to claim 1, wherein a load adaption is formed by fiber orientation on the preform structure in a form of hybrid yarns which are at least one of introduced singly and plurally at least one of on top of one another other and next to one another.

4. The control arm according to claim 1, wherein the bearing location, in a form of a means for receiving the elastomer bearing or the ball joint, is formed by a bush integrated into the control arm, which comprises at least one of plastic, aluminum alloy, magnesium alloy, glass fiber plastic material and carbon fiber plastic material.

5. The control arm according to claim 4, wherein the bush is connected to the fiber-plastic composite structure in a materially-locking manner, and is either molded on the fiber-plastic composite structure or bonded to the fiber-plastic composite structure.

6. The control arm according to claim 1, wherein a means for receiving the elastomer bearing or the ball joint, formed from the fiber-plastic composite structure, forms a first part of either a bearing bush or a joint housing, to which at least one additional housing part attaches in a form-locking manner, for receiving the elastomer bearing or a ball pivot of the ball joint, and the first part of the bearing bush or the joint housing and the additional housing part are connected to one another in at least one of:
a materially-locking manner,
a form-looking manner, and
a force-locking manner.

7. The control arm according to claim 6, wherein the connection of the first part of the bearing bush or the joint housing and the additional housing part is formed by at least one of bonding, riveting, injection, thermoplastic overmolding and thermosetting overmolding.

8. The control arm according to claim 6, wherein the additional housing part is formed from a light metal material and at least one additional material is inserted between the first part of the bearing bush or the joint housing and the additional housing part by at least one of thermoplastic overmolding and thermosetting overmolding.

9. The control arm according to claim 1, wherein at least one sensor is integrated into the fiber-plastic composite structure, and the at least one sensor detects changes in the fiber-plastic composite structure so as to inform of either overstressing or overloading.

10. The control arm according to claim 1, wherein either an adjustment device is integrated into the control arm such that the control arm is length adjustable, or the control arm has a displaceable tie rod.

11. The control arm according to claim 10, in combination with a steering mechanism.

* * * * *